United States Patent
Potentas

(10) Patent No.: US 11,889,412 B2
(45) Date of Patent: Jan. 30, 2024

(54) METHOD OF AND RADIO DATA COMMUNICATION EQUIPMENT FOR DATA EXCHANGE WITH NAUTICAL VESSELS AND NAUTICAL BEACONS

(71) Applicant: Telefonaktiebolaget LM Ericsson (publ), Stockholm (SE)

(72) Inventor: Wojciech Potentas, Lodz (PL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 222 days.

(21) Appl. No.: 17/617,767

(22) PCT Filed: Jun. 17, 2019

(86) PCT No.: PCT/EP2019/065827
§ 371 (c)(1),
(2) Date: Dec. 9, 2021

(87) PCT Pub. No.: WO2020/253932
PCT Pub. Date: Dec. 24, 2020

(65) Prior Publication Data
US 2022/0240175 A1     Jul. 28, 2022

(51) Int. Cl.
*H04W 48/20*     (2009.01)
*H04W 28/16*     (2009.01)
(Continued)

(52) U.S. Cl.
CPC .......... *H04W 48/20* (2013.01); *H04W 28/16* (2013.01); *H04W 72/51* (2023.01); *H04W 72/541* (2023.01); *H04W 74/0841* (2013.01)

(58) Field of Classification Search
CPC ... H04W 48/20; H04W 72/51; H04W 72/541; H04W 28/16; H04W 74/0841
See application file for complete search history.

(56) References Cited

U.S. PATENT DOCUMENTS

| 6,414,629 B1 | 7/2002 | Curcio |
| 9,084,241 B2 * | 7/2015 | Madan ................. H04W 76/14 |

(Continued)

FOREIGN PATENT DOCUMENTS

| CN | 104285457 A | 1/2015 |
| CN | 104854926 A | 8/2015 |
| KR | 1020130074901 A | 7/2013 |

OTHER PUBLICATIONS

International Search Report and Written Opinion dated May 19, 2020 for International Application No. PCT/EP2019/065827 filed Jun. 17, 2019, consisting of 18-pages.

(Continued)

*Primary Examiner* — Ajay Cattungal
(74) *Attorney, Agent, or Firm* — Christopher & Weisberg, P.A.

(57) ABSTRACT

A method of and radio data communication equipment arranged for data exchange by Wide Area Network radio data communication equipment operating as a Radio Base Station applied on a plurality of nautical vessels, and by radio data communication equipment operating as User Equipment applied on a nautical beacon. A radio communication link between the radio data communication equipment of a nautical vessel and a nautical beacon is established when an indication of availability of radio access resources of the radio data communication equipment of a nautical vessel is received by the radio data communication equipment of a nautical beacon and when the radio data communication equipment of a nautical beacon is in an operating position.

20 Claims, 6 Drawing Sheets

(51) Int. Cl.
    *H04W 74/08*     (2009.01)
    *H04W 72/51*     (2023.01)
    *H04W 72/541*     (2023.01)

(56) References Cited

U.S. PATENT DOCUMENTS

| | | | |
|---|---|---|---|
| 11,751,073 B2* | 9/2023 | Yerramalli | H04W 16/28 |
| | | | 370/329 |
| 2002/0045444 A1 | 4/2002 | Usher et al. | |
| 2007/0241889 A1 | 10/2007 | Kopp | |
| 2013/0308551 A1* | 11/2013 | Madan | H04W 72/20 |
| | | | 370/329 |
| 2016/0150450 A1 | 5/2016 | Balasubramanian et al. | |
| 2016/0173322 A1 | 6/2016 | Purpura et al. | |
| 2017/0251509 A1* | 8/2017 | Siomina | H04W 76/14 |
| 2018/0191420 A1* | 7/2018 | Kutz | H04B 7/0417 |
| 2018/0375940 A1 | 12/2018 | Binder et al. | |
| 2019/0349159 A1* | 11/2019 | Nammi | H04L 1/0071 |
| 2022/0240175 A1* | 7/2022 | Potentas | H04W 28/16 |

OTHER PUBLICATIONS

International Preliminary Report on Patentability dated Sep. 6, 2021 for International Application No. PCT/EP2019/065827 filed Jun. 17, 2019, consisting of 8-pages.
Indian Office Action dated Sep. 6, 2022 for Patent Application No. 202117055976, consisting of 5-pages.
Chinese Office Action and English Summary dated Jun. 15, 2023 for Application No. 201980097554.9, consisting of 12 pages.

\* cited by examiner

US 11,889,412 B2

METHOD OF AND RADIO DATA COMMUNICATION EQUIPMENT FOR DATA EXCHANGE WITH NAUTICAL VESSELS AND NAUTICAL BEACONS

CROSS-REFERENCE TO RELATED APPLICATION

This application is a Submission Under 35 U.S.C. § 371 for U.S. National Stage Patent Application of International Application Number: PCT/EP2019/065827, filed Jun. 17, 2019 entitled "METHOD OF AND RADIO DATA COMMUNICATION EQUIPMENT FOR DATA EXCHANGE WITH NAUTICAL VESSELS AND NAUTICAL BEACONS," the entirety of which is incorporated herein by reference.

TECHNICAL FIELD

The present disclosure generally relates to data exchange in a nautical or marine environment and, in particular, to data exchange by Wide Area Network, WAN, radio data communication equipment operating as Radio Base Station, RBS, applied on nautical vessels and radio data communication equipment operating as User Equipment, UE, applied on nautical beacons.

BACKGROUND

Marine or nautical radio communication systems provide waterborne vehicles, ranging from large container ships and cruise ships to small sailing yachts and fishing boats, as well as "road sign" devices deployed on the water, such as cardinal, isolated danger or safe water buoys or beacons used to indicate particular conditions on or under the water, to communicate or exchange data with each other and with users on the shore.

A marine radio communication system generally involves on-shore or terrestrial radio stations and satellite communication networks, to make the collected information available to other waterborne vehicles.

For example, as part of the U.S. GLobal Ocean ECosystem Dynamics (GLOBEC) Northwest Atlantic/Georges Bank program, the International geosphere-biosphere programme project responsible for understanding how global change will affect the abundance, diversity and productivity of marine populations, moorings were deployed to measure the temporal variability of both physical and biological characteristics on the Bank, such as water temperature, salinity and water velocity. Measurements were periodically transmitted to operators on the shore according to a fixed transmission schedule, such as for 50 seconds every three hours.

NavCom is a satellite based navigation system for precise positioning on a global scale.

Other examples of data measured and exchanged over radio links relate to maritime safety information, which may include navigational and meteorological warnings, meteorological forecasts, warnings about dangers to navigation, warnings of missing vessels and other urgent messages. The nature of such information makes it crucial to be received by the ships in a timely manner, such that fixed transmission schedules are not suitable for such application scenarios, as same may fail to supply the required information on time to avoid dangerous situations.

NavTex (Navigational Telex) is an international service for delivery of navigational and meteorological warnings and forecasts, as well as urgent maritime safety information to ships, and belongs to the Global Maritime Distress and Safety System (GMDSS) which is a set of procedures, technologies and radio equipment currently available for sailing and sea transport based on UHF and VHF nautical, terrestrial and geostationary satellite communication, transponders and radars.

Continuous regular transmission is not optimal in terms of energy saving, which may be an important requirement for nautical devices such as beacons or buoys at sea, which are expected to sustain for a long period of time without the need of replacing energy storage devices.

Accordingly, there is a need for an energy efficient nautical or marine radio communication system capable of timely exchanging data between nautical vessels and nautical beacons.

SUMMARY

The above mentioned and other problems are solved, in a first aspect of the present disclosure, by a method of data exchange by Wide Area Network, WAN, radio data communication equipment operating as a radio base station, RBS, applied on a plurality of nautical vessels, for providing radio access to radio data communication equipment operating as a User Equipment, UE, applied on at least one nautical beacon. The WAN radio data communication equipment applied at the nautical vessels is arranged for data exchange with radio data communication equipment operating as UE applied on a same nautical vessel, and for data exchange with a terrestrial core data communication network.

The method comprising:
  receiving, by the WAN radio data communication equipment applied on a first nautical vessel, from the radio data communication equipment operating as UE applied on the first nautical vessel, radio access collision information relating to WAN radio communication equipment applied on a second nautical vessel operating WAN radio access resources colliding with WAN radio access resources operated by the WAN radio communication equipment applied on the first nautical vessel;
  reporting, by the WAN radio data communication equipment applied on the first nautical vessel, the radio access collision information to the terrestrial core data communication network;
  receiving, by the WAN radio data communication equipment applied on the first nautical vessel, from the terrestrial core data communication network, radio resource allocation information for operating WAN radio access resources by the WAN radio data communication equipment applied on the first nautical vessel, and
  establishing, by the WAN radio data communication equipment applied on the first nautical vessel, a radio data communication link with radio data communication equipment applied on at least one nautical beacon in an operating position thereof, based on the radio resource allocation information for operating WAN radio access resources.

The present disclosure is based on the insight that a versatile, flexible, and well-timed data exchange, such as warnings of dangerous conditions to or between several nautical vessels can be made available via WAN radio data communication equipment operating as RBS deployed on the nautical vessels, and radio data communication equipment operating as UE arranged on several waterborne devices, such as nautical beacons, either fixed or mobile, such as on small ships or the like.

For the purpose of the present disclosure, the term radio base station, RBS, is to be construed to comprise communication equipment providing a radio connection with the UE, i.e. the radio data communication equipment operating as UE, and is also termed wireless base station, eNodeB, eNB, or the like, dependent on a specific radio access technology used. Establishing a radio data communication link or connection in accordance with the present disclosure also implies establishing a data communication session, performing an attach procedure, or setting up a data communication channel or the like between respective radio communication equipment.

In practice, the nautical vessels comprising WAN radio data communication equipment operating as RBS essentially present multiple moving radio communication cells providing radio access resources assigned by or allocated to a respective nautical vessel from the terrestrial core data communication network. For a proper radio data exchange of a UE with several radio cells or RBSs, it is crucial that the WAN radio data communication equipment or radio cells of each nautical vessel, when in communication neighbourhood of each other and/or in the communication neighbourhood of a radio data communication user operating as a UE, such as deployed on a nautical beacon, can be identified separately or uniquely by the UE.

According to the present method, the WAN radio data communication equipment operating on a first nautical vessel may be informed by the UE on the same nautical vessel that there is a possible collision between the WAN radio access resources provided by the first nautical vessel and a second nautical vessel. For example in that the UE on the first nautical receives same random access sequences from both the first and the second nautical vessels. In that case, the WAN radio data communication equipment on the first nautical vessel reports the collision information to the terrestrial core data communication network that is accessible from the nautical vessels, for example by a satellite communication system.

A collision between radio access resources provided by the first and second nautical vessels is resolved, by the terrestrial core data communication network, by re-assigning or re-allocating radio access resources to one or both of the WAN radio data communication equipment of a nautical vessel. The WAN radio data communication equipment on the first nautical vessel is informed by, i.e. receives from the terrestrial core data communication network information concerning the radio access resources that may be used for data exchange by the WAN radio data communication equipment arranged on the nautical vessels.

The step of receiving radio resource allocation information by the WAN radio data communication equipment of the first nautical vessel also encompasses the case in which the WAN radio data communication equipment may stay to operate on the radio access resources previously assigned or allocated to it, i.e. when no re-assignment or re-allocation of access resources is required by the WAN radio data communication equipment of the first nautical vessel.

Once the radio access resource collision has been resolved, a radio data communication link for radio data exchange is established between the WAN radio data communication equipment on the first nautical vessel and radio data communication equipment applied on the nautical beacon in an operating position thereof.

In practice, the WAN radio data communication equipment deployed on the nautical vessels and operating as RBS may be accessed by radio data communication equipment operating as a UE from a relatively short range of, for example, up to 15 kilometres. In such a case, the above way of resolving collision between radio access resources by the WAN radio data communication equipment of the nautical vessels will be timely and efficient, as nautical vessels still having a relative large distance from each other will actually not interfere each others radio communication, or provide difficulties of being identified by a same nautical beacon.

Once established, the radio data communication link allows information, such as an identification of a nautical beacon in the neighbourhood, to be conveyed to the nautical vessels directly, without relying on the operation of on-shore radio stations.

Whether a beacon device, i.e. the radio communication equipment thereof, is in an operating position to establish a radio data communication link with the WAN radio data communication equipment deployed on the nautical vessel, generally, may be determined when radio access signals transmitted by the WAN radio data communication equipment deployed on the nautical vessel are received by the beacon device. When detecting presence of WAN radio data communication equipment deployed on a nautical vessel, a beacon device may decide whether the operating position for establishing a radio data communication is enabled through evaluating whether measurement data that the beacon device collects meet a predetermined condition, for example.

It is seen that the present arrangement of WAN radio data communication equipment on the nautical vessels operating as RBS, possible at a large distance from the land or shore, has the benefit of allowing direct communication between the nautical vessels and nearby nautical beacons and allows nautical beacons to connect to the WAN radio data communication equipment on a nautical vessel on occasions that it is possible and sensible to transmit data, avoiding meaningless transmissions which are not received by any intended party, such as in the case of transmissions according to a predetermined or fixed schedule, for example. Transmitting in an operating position only, saves energy of the nautical beacon.

The provision of RBS functionality on board of a nautical vessel also enables to establish a radio data communication link with WAN radio data communication equipment applied on a further nautical vessel, for exchanging data between the WAN radio data communication equipment applied on the nautical vessels.

Such a radio data communication link established directly between first and second nautical vessels may be used, for example, for exchanging information about the surrounding nautical conditions, for timely alerting a nautical vessel of the presence of any potential danger and problems that same may encounter when heading in a certain direction, for example.

As indicated above, the nautical beacons may be geographically stationary beacons or non-stationary mobile beacons. Geographically non-stationary beacons may be deployed on smaller watercraft, such as fishing boats or small yachts, for example. By keeping, for a certain period of time, such as 10-30 minutes, a list of identifications of radio data communication equipment applied on nautical beacons connected to the WAN radio data communication equipment on a nautical vessel, crew members on the nautical vessel are kept informed of the current nautical surroundings of the nautical vessel, especially of a dynamically changing situation in the neighbourhood of the nautical vessel, such that crew members are alerted and safety of operations on the sea or ocean is enhanced.

Moreover, when the WAN radio data communication equipment on the nautical vessel is in the communication neighbourhood of one or more mobile nautical beacons, the WAN radio data communication equipment on the nautical vessel, based on the list of identifications, may exchange a warning message of the presence of at least one nautical beacon, either a stationary or mobile nautical beacon, by establishing at least one further radio data communication link between radio data communication equipment applied on the at least one nautical beacon and radio data communication equipment applied on at least one geographically non-stationary nautical beacon. Such a warning message is advantageous in promoting safe operation of marine craft in the neighbourhood of nautical beacons.

The at least one further radio data communication link may be operated as a so-called sidelink, established between the radio data communication equipment operating as UE applied on the respective nautical beacons.

Establishing, under control of the RBS at the nautical vessel, a sidelink between radio data communication equipment applied on the at least one nautical beacon and radio data communication equipment applied on the at least one geographically non-stationary further nautical beacon is efficient in that a sidelink allows direct communication between the nautical beacons without occupying possible scarce data communication resources of the radio communication equipment applied at a nautical vessel.

In the case that the WAN radio data communication equipment applied on the first nautical vessel is already connected by a radio communication link to a nautical beacon, and a second nautical vessel approaches that nautical beacon, the WAN radio data communication equipment applied on the first nautical vessel may receive, from the radio data communication equipment applied on the respective nautical beacon, a request for handover of the radio communication link to the WAN radio data communication equipment applied on the second nautical vessel, and in response to the handover request performs the handover of the radio communication link to the WAN radio data communication equipment applied on the second nautical vessel.

In resolving a radio access resource collision, the terrestrial core data communication network may take various factors into consideration relating to the actual status of the nautical vessels, such as velocity of the nautical vessels, relative and geographic direction of movement of the nautical vessels, the number of nautical vessels taking part in a possible collision, the availability of radio access resources, and so on.

In accordance with an embodiment of the present disclosure, the WAN radio data communication equipment applied on the plurality of nautical vessels receives, from the terrestrial core data communication network, respective initial WAN radio resource allocation information for operating WAN radio access resources by the WAN radio data communication equipment applied on the plurality of vessels, wherein the radio resource allocation information for operating WAN radio access resources by the WAN radio data communication equipment applied on the first nautical vessel, in case of a radio access resource collision, is determined based on the respective initial WAN radio access resources and actual status information of the first and second nautical vessels.

In this embodiment, the WAN radio access resources provided by the WAN radio data communication equipment applied on the plurality of vessels are allocated and re-allocated under control of the core network.

In practice, nautical beacons, besides operating as cardinal, isolated danger or safe water buoys or beacons used to indicate particular conditions on or under the water, may also be equipped for measuring water conditions or the like and to communicate or exchange measurement data with users.

In accordance with an embodiment of the present disclosure, the terrestrial core data communication network comprises a data storage device, accessible by the WAN radio data communication equipment applied on a nautical vessel, for storing data relating to nautical beacons, whereas the method further comprises accessing the data storage device, by the WAN radio data communication equipment applied on the first nautical vessel, for exchanging data relating to the at least one nautical beacon.

Storing data relating to a nautical beacon remotely with the core network is not only efficient considering the sometimes limited hardware and energy resources of a nautical beacon, but is also advantageous for making these data available to a number of users, both on water and on land.

From time to time data measured by a beacon will be refreshed. On the other hand, due to meteorological conditions and other external influences, the geographic position or coordinates of a geographic stationary beacon may change, for example.

Accordingly, in an embodiment of the present disclosure the method further comprises, updating, by the WAN radio data communication equipment applied on a nautical vessel, through radio data communication equipment of at least one nautical beacon, data relating to the at least one nautical beacon.

The updating may comprise an update of the respective data of a nautical beacon stored with the terrestrial core network, stored with the nautical beacon itself and/or an update of respective data of a nautical beacon exchanged by the WAN radio communication equipment of a nautical vessel with other vessels and mobile nautical beacons, for example. The updating of geographic position or coordinates of a geographic stationary beacon may be performed only when necessary, however such to allow the nautical beacon to have sufficiently precise data regarding its location, for example.

A second aspect of the present disclosure provides a method of data exchange, by radio data communication equipment operating as a User Equipment, UE, applied on a nautical beacon, for accessing Wide Area Network, WAN, radio access resources provided by WAN radio data communication equipment operating as a radio base station, RBS, applied on a nautical vessel.

The method comprising:
  receiving, by the radio data communication equipment applied on the nautical beacon, from WAN radio data communication equipment applied on a nautical vessel, an indication of availability of WAN radio access resources;
  receiving, by the radio data communication equipment applied on the nautical beacon, from an operating position detection device of the nautical beacon, an indication that the nautical beacon is in an operating position for establishing a radio communication link, and
  establishing, by the radio data communication equipment applied on the nautical beacon, a radio data communication link with the WAN radio data communication equipment of the nautical vessel based on the WAN radio access resources.

When a moving nautical vessel having a WAN radio data communication equipment operating as a radio base station, RBS, deployed thereon comes in the communication neighbourhood of a nautical beacon, i.e. arrives at a distance from the nautical beacon at which the radio data communication equipment of the nautical beacon operating as a UE receives radio signals from the WAN radio equipment applied at the nautical vessel, the radio data communication equipment of the nautical beacon may receive an indication of availability of WAN radio access resources, such as random access sequences transmitted by the WAN radio data communication equipment of the nautical vessel.

Under such a circumstance, upon deciding that the nautical beacon is in an operating position for establishing a radio communication link with the WAN radio data communication equipment operating as a RBS, a radio communication link is established between the WAN radio data communication equipment operating as the RBS and the radio data communication equipment operating as the UE, respectively deployed on the nautical vessel and the nautical beacon. The thus established radio communication link or communication session, attach, or data channel may be used for data exchange and communication between the nautical vessel and the nautical beacon.

The radio data communication equipment operating as the UE, according to the above method, performs transmission on occasion. That is, the radio communication equipment operating as UE is continuously operative for receiving availability of radio resource signals from WAN equipment of a nautical beacon, however transmission by the radio data communication equipment of the nautical beacon operating as the UE may only start when the WAN radio data communication equipment operating as the RBS is in a communication neighbourhood therewith. The above method therefore allows the nautical beacon to avoid meaningless transmissions which are not received by any intended party, and accordingly saves scarce electric energy or power of the nautical beacon. This allows to implement nautical beacons with low power radio technologies.

In accordance with an embodiment of the present disclosure, the method according to the second aspect further comprises:
  keeping, for a predetermined first period of time, by the radio data communication equipment applied on the nautical beacon, a list of identifications of WAN radio data communication equipment applied on the nautical vessels available for radio data communication;
  disconnecting, by the data communication equipment applied on the nautical beacon, a radio data communication link with the WAN radio data communication equipment applied on a nautical vessel, after a predetermined second period of time, and
  establishing, by the radio data communication equipment applied on the nautical beacon, on a Round Robin basis or routine according to the list of identifications, a respective radio data communication link with the available WAN radio data communication equipment applied on a respective nautical vessel.

The list of identifications of available WAN radio data communication equipment includes WAN radio data communication equipment of a nautical vessel that is already connected with the radio data communication equipment of the nautical beacon and those nautical vessels of which an indication of availability of WAN radio access resources is received within the first period of time. Such as, for example, received within a first time period of 10-15 minutes. In practice, a radio link may be disconnected after a second time period of, for example, 5-10 seconds. This second period of time may vary according to the amount of data to be transmitted from a nautical beacon and the available data rate.

The above procedure allows the nautical beacon to connect to a plurality of nautical vessels in the vicinity thereof, allowing each nautical vessel of becoming aware of the presence of the nautical beacon, such that the nautical vessels may take any measure necessary to ensure safe operation, for example.

In accordance with an embodiment of the present disclosure, whether the radio data communication equipment of a nautical beacon is in an operating position for establishing a radio link is determined by:
  periodically determining, by the operating position detection device of the nautical beacon, altitudes of the nautical beacon;
  calculating, by the operating position detection device of the nautical beacon, a reference altitude, based on the periodically determined altitudes of the nautical beacon, and
  determining, by the operating position detection device of the nautical beacon, that the radio data communication equipment of the nautical beacon is in an operating position for establishing a radio link when a present altitude of the nautical beacon exceeds a threshold value above the reference altitude.

In this manner it is assured that the nautical beacon only establishes a data link and exchanges data with a nautical vessel when the beacon is in a geographical or physical position such that there is a reasonable change of success that data transmitted by the radio data communication equipment of the beacon will be received by the WAN radio data communication equipment.

When the beacon is temporarily located in a valley or trough of the waves at sea, that is below the threshold value, data transmitted by a beacon will most probably not received at a vessel. Wasting scarce battery energy at the nautical beacon is precluded by not establishing a radio link with the nautical vessel or not transmitting data from the beacon when in such a non-operating position.

Transmission by the radio data communication equipment applied on a nautical beacon under extreme weather condition is very important, in particular when the WAN radio data communication equipment operating as the RBS is in a close enough region or proximity to a nautical beacon experiencing dramatic conditions that may have an impact or other influence on the nautical vessel.

In accordance with the above embodiment, an extreme weather condition may be determined by measuring wave height, i.e. altitude, to which the nautical beacon is exposed.

Proximity of the WAN radio data communication equipment operating as the RBS is determined, in an embodiment, by checking whether the indication of availability of WAN radio access resources is received within a predetermined third period of time prior to receiving the indication that the nautical beacon is in an operating position for establishing a radio communication link. This predetermined third period of time may amount, for example, 10-15 minutes. Transmission on occasion is thereby established, contributing to an efficient electrical energy consumption by the nautical beacon.

The method in accordance with the above embodiment further helps to save energy by stopping the periodic determination or measurement of altitudes by the operating position detection device of the nautical beacon after a predetermined fourth period of time after stopping receipt of the indication of availability of radio resources by the radio data communication equipment of the nautical beacon.

In an example, if the nautical vessel with the WAN radio data communication equipment operating as the RBS moves away from a nautical beacon, the received radio signal strength will gradually decrease and then the radio data communication equipment on the nautical beacon will stop receiving indications of availability of WAN radio access resources. The nautical beacon then waits for a fourth period of time, such as 10-15 minutes, and stops measuring the altitudes and related calculations. Though it might seem redundant to keep measuring for a longer period of time, this allows transmission by the radio data communication equipment of the nautical beacon to start again in a short time, when necessary.

In a third aspect the present disclosure comprises nautical vessel Wide Area Network, WAN, radio data communication equipment arranged for operating as radio base station, RBS, for providing radio access to radio data communication equipment operating as a User Equipment, UE, applied on at least one nautical beacon.

The WAN radio data communication equipment arranged for data exchange with radio data communication equipment operating as UE applied on a same nautical vessel, and for data exchange with a terrestrial core data communication network, the nautical vessel WAN radio data communication equipment comprising a transceiver device and a processing device arranged for:
  receiving, by the transceiver device, from the radio data communication equipment operating as UE on the first nautical vessel, radio access collision information relating to WAN radio communication equipment of a second nautical vessel operating WAN radio access resources colliding with WAN radio access resources operated by the WAN radio communication equipment of the first nautical vessel;
  reporting, by the transceiver device, the radio access collision information to the terrestrial core data communication network,
  receiving, by the transceiver device, from the terrestrial core data communication network, information for operating WAN radio resource allocation resources by the WAN radio data communication equipment of the first nautical vessel, and
  establishing, by the processing device, a radio data communication link with radio data communication equipment of at least one nautical beacon in an operating position thereof, based on the information for operating WAN radio access resources.

In a fourth aspect of the present disclosure, there is provided nautical beacon radio data communication equipment arranged for operating as a User Equipment, UE, for accessing Wide Area Network, WAN, radio access resources provided by WAN radio data communication equipment operating as a radio base station, RBS, applied on a nautical vessel, the nautical beacon radio data communication equipment comprising a transceiver device, a processing device, and an interface for communicating with an operating position detection device, the nautical beacon radio data communication equipment arranged for:
  receiving, by the transceiver device, from WAN radio data communication equipment applied on a nautical vessel, an indication of availability of WAN radio access resources;
  receiving, by the processing device, from the operating position detection device, that the transceiver device is in an operating position for establishing a radio communication link, and
  establishing, by the transceiver device, a radio data communication link with the WAN radio data communication equipment applied on the nautical vessel based on the WAN radio access resources.

In practice, the nautical beacon radio data communication equipment is at least one of a geographically stationary nautical beacon operating a Narrowband Internet of Things, NB-IoT, UE device and/or a geographically non-stationary nautical beacon operating as a Long Term Evolution, LTE, Category M1 UE device, for example.

The nautical vessel WAN radio data communication equipment may be arranged to operate a Massive Internet of Things, MIoT, cell, for example.

In a fifth aspect of the present disclosure, there is provided a computer program product, comprising program code means stored on a computer readable medium, the program code means arranged to perform the method described in connection with the first aspect of the present disclosure, when executed by at least one processing device of nautical vessel Wide Area Network, WAN, radio data communication equipment.

In a sixth aspect of the present disclosure, there is provided a computer program product, comprising program code means stored on a computer readable medium, the program code means arranged to perform the method described in connection with the second aspect of the present disclosure, when executed by at least one processing device of nautical beacon radio data communication equipment.

The present disclosure takes full advantage of mobile digital information and communication technology, which approached in the nineties of twentieth century, and solves the weak spectral efficiency and expensive end user equipment of prior art maritime safety information systems.

At present, the mobile digital information and communication technology already achieved its fifth generation. An important branch thereof being the massive internet-of-things, designed to assure end-to-end connection and Quality of Service, QoS, needed for little volume messages, together with radio and energy resources saving.

The above and other aspects of the disclosure will be apparent from and elucidated with reference to the examples described hereinafter.

DETAILED DESCRIPTION

In the following description, the terms "nautical vessel" and "ship" are used interchangeably; the terms "Wide Area Network, WAN, radio data communication equipment", "Radio Base Station, RBS" and "Massive Internet of Things, MIoT, cell" are used interchangeably; the terms "nautical beacon", "beacon device", "MIoT modem", and "beacon" are also used interchangeably.

Figure 1:
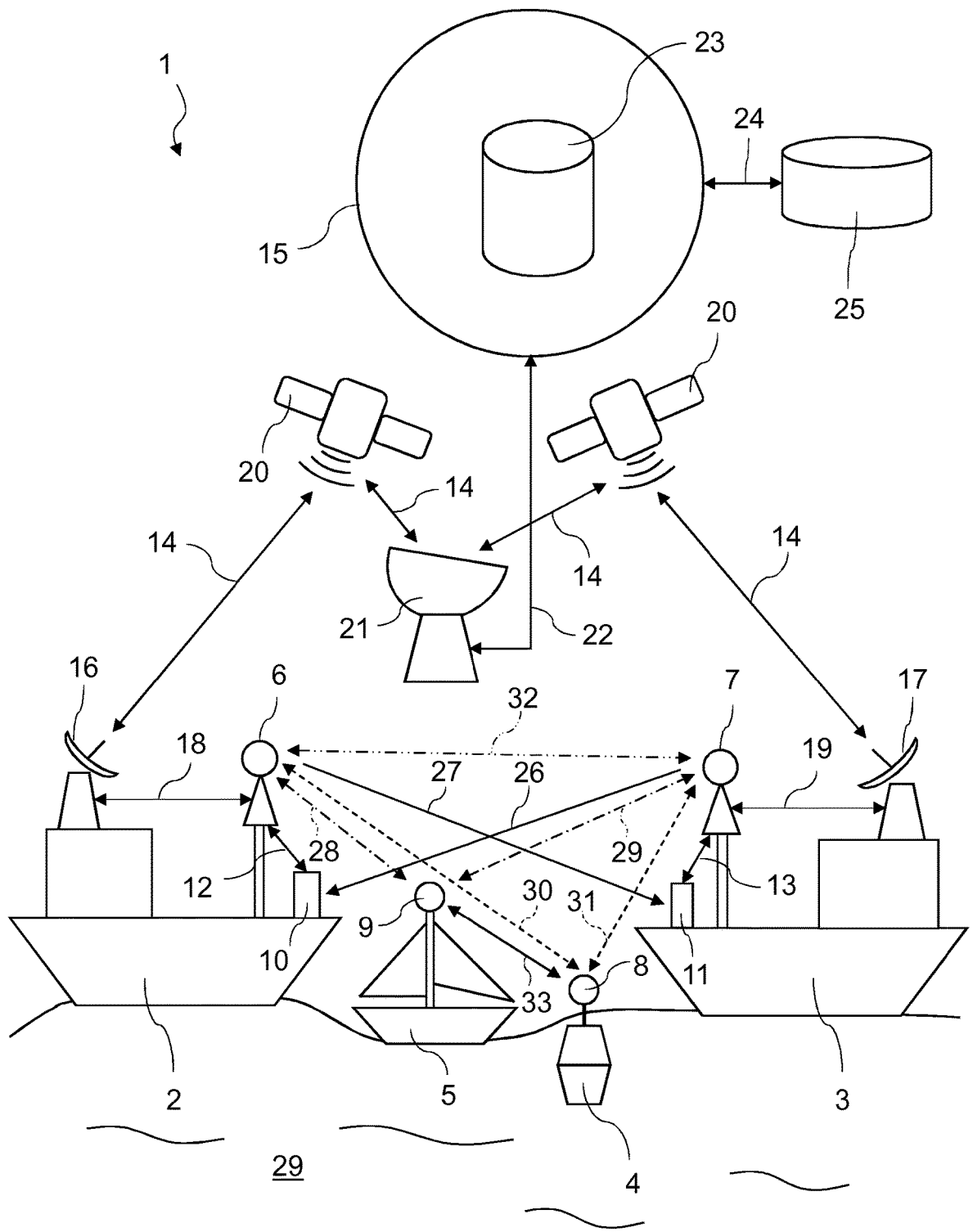
FIG. 1 schematically illustrates a marine or nautical radio communication system in accordance with an embodiment of the present disclosure.

FIG. 1 schematically illustrates a marine or nautical radio data communication system 1 in accordance with an embodiment of the present disclosure. For simplicity reasons, FIG. 1 illustrates a nautical radio data communication system with only two nautical vessels 2, 3 and only two nautical beacons 4, 5, having radio data communication deployed thereon. However, those skilled in the art will appreciate that a practical nautical radio data communication system may comprise any number of nautical vessels and beacons applied with respective radio equipment.

The marine or nautical radio data communication system 1 comprises Wide Area Network, WAN, radio data communication equipment 6, 7 operating as radio base stations, RBSs, that are arranged on nautical vessels such as a first ship 2 and a second ship 3, and radio data communication equipment 8, 9 operating as a User Equipment, UE, arranged on nautical beacons 4, 5.

The WAN radio data communication equipment 6, 7 on the nautical vessels 2, 3 may operate a Massive Internet of Things, IoT, Radio Access Network, RAN, MIoT RAN, or MIoT cell, node or server. Such as an Evolved Universal Mobile Telecommunications System, UMTS, Terrestrial Radio Access, E-UTRA, Network, E-UTRAN, node also known as Evolved Node B, eNodeB or eNB according to the Long Term Evolution, LTE, technology, or an other WAN radio data communication technology.

The MIoT cell radio data communication equipment 6, 7 may have a service range as an LTE cell, of up to a couple of kilometres, such as 15 kilometres, for example, which may be easily available with MIoT Radio Access Technology, RAT. The MIoT cell radio data communication equipment 6, 7 may also comprise coverage enhancement, so as to make its range wider and therefore accessible by many bandwidth reduced radio communication devices.

The nautical vessels 2, 3 also comprise on-board User Equipment, UE, 10, 11, respectively, operatively connecting 12, 13, either wired or wireless, to the WAN radio data communication equipment 6, 7 of a respective nautical vessel 2, 3.

A nautical beacon 4, 5 may be a geographically stationary beacon, such as a buoy type beacon 4, fixed to the sea or lake bottom, for example to signal a nearby dangerous object on the sea bottom or in the water 29, or a geographically non-stationary or mobile beacon device, such as ship type beacon 5 arranged on a mast or at the deck of small marine vessel like a yacht, a boat, or a kayak, or the like. That is small in size with respect to the size of a nautical vessel 2, 3 comprised of WAN radio data communication equipment 6, 7.

The radio data communication equipment 8, 9 deployed on the nautical beacons 4, 5 may be implemented by an MI modem. That is, a geographically stationary nautical beacon 4 may be implemented with a Narrowband IoT, NB-IoT, modem, while a mobile nautical beacon 5 may comprise an LTE, UE Category M1, CAT-M1 modem, for example.

An NB-IoT device operates in MI RAN using a DoNAS, Data over Non-Access Stratum, connection type when there is no E-RAB, Evolved UTRAN Radio Access Bearer. Cat-M1 devices are also working in MI RAN but with establishment of the E-RAB.

The WAN radio data communication equipment 6, 7 deployed on a nautical vessel 2, 3 located in the waters 29 worldwide, form an International, Intercontinental Radio Access Network and connect to a terrestrial based Core Network, CN, 15 deployed somewhere at the shore.

The CN 15 may be accessed 14 by the WAN radio data communication equipment 6, 7 of a nautical vessel 2, 3 via on-board satellite radio data communication equipment 16, 17, land based satellite radio data communication equipment 21 connecting 22 to the CN 15, and a satellite communication network 20, for example. The satellite radio data communication equipment 16, 17 of a nautical vessel 2, 3 is operatively connected 18, 19, either wired or wireless, to the on-board WAN radio data communication equipment 6, 7 of the respective vessel 2, 3

The CN 15 may operate in accordance with any core network communication technology and comprises a Home Subscriber Server, HSS, or User Data Management, UDM, function or server, generally indicated by reference numeral 23, for example. Both geographically stationary and mobile nautical beacons 4, 5 have their International Mobile Subscriber Identity, IMSI, registration registered with the server 23 of the CN 15. A mobile nautical beacon 5 may also have a Uniform Resource Identifier, URI, registered in the server 23, for example.

An information database 25 may connect 24 locally or remotely with the CN 15, providing detailed information about the geographically stationary nautical beacons 4, such as identity information, geographical coordinates and basin name, a name of the closest port or harbour, if any, and type or name of a danger indicated by a respective geographically stationary nautical beacon 4. A mobile nautical beacon 5 may also have information and identity data stored in the information database 25.

A non-limitative list of examples of data items stored in the information database 25 comprises: north cardinal buoy, geographically stationary; yellow buoy, geographically stationary; safe waters, geographically stationary; right side of sailing track, geographically stationary; left side of sailing track, geographically stationary; fishing nets location, geographically stationary; type of geographically mobile nautical beacon such as small vessel like sail yacht, motor boat, rowing boat, kayak.

In the following, methods of data exchange between the radio data communication equipment 6, 7, 8, 9 deployed on the nautical vessels 2, 3 and the nautical beacons 4, 5 will be described with reference to FIG. 1 as well FIGS. 2 to 6.

Figure 2:
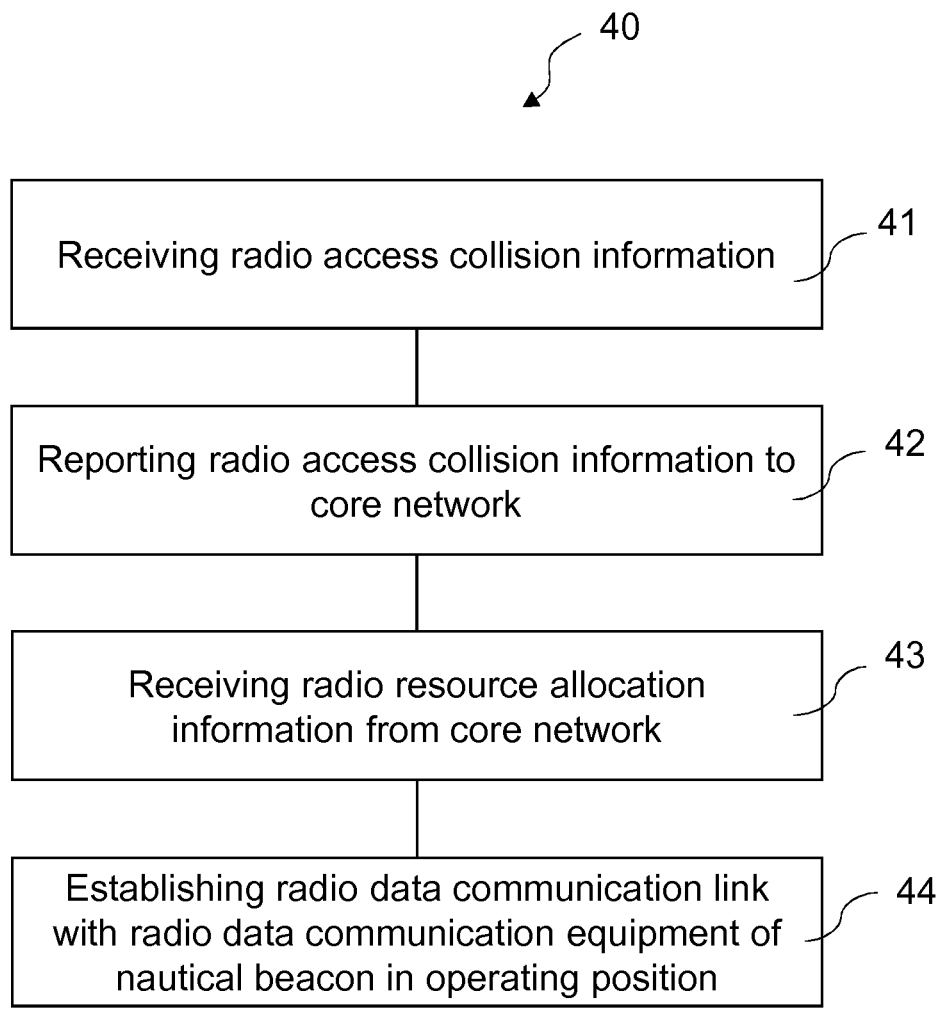
FIG. 2 illustrates, in a flow chart, a method of data exchange by WAN radio data communication equipment applied on a nautical vessel in accordance with an embodiment of the present disclosure.

FIG. 2 illustrates, in a flow chart type diagram, a method 40 of data exchange by WAN radio data communication equipment 6, 7 applied on a nautical vessel 2, 3 in accordance with an embodiment of the present disclosure. In the flow chart type diagrams of the present description, the sequence of steps is assumed to run from the top of the diagram to the bottom thereof.

The WAN radio data communication equipment 6, 7 on the nautical vessels 2, 3 transmit radio resource allocation information, for example in the form of random access, RA, sequences, such as Zadoff-Chu sequences, corresponding to a Physical Cell Identity, PCI, of the WAN radio data communication equipment 6, 7, to announce availability of radio access resources that can be accessed by the nautical vessels 2, 3.

At step 41, "Receiving radio access collision information", the WAN radio data communication equipment 6 on a first nautical vessel 2 receives radio access collision information, indicating that there is a collision between WAN radio access resources provided by the WAN radio data communication equipment 6 and radio access resources provided or operated by WAN radio communication equipment 7 applied on a second nautical vessel 3. This radio access collision information is provided by the radio data communication equipment 10 arranged on the first nautical vessel 2, when receiving the radio resource allocation information transmitted by the radio data communication equipment 7 applied on the second nautical vessel 3, as schematically indicated by arrow 26 in FIG. 1.

Specifically, the radio data communication equipment 10, 11 operating as UE on a nautical vessel 2, 3 constantly operates for receiving 26, 27 radio resource allocation information, such as RA sequences, from other nautical vessels in its communication neighbourhood. When the radio data communication equipment 10, 11 on the first ship 2 receives 26 the same radio resource allocation information, for example RA sequences, transmitted by the WAN radio data communication equipment 7 of the second nautical vessel 3, as being provided by the WAN radio data communication equipment 6 of nautical vessel 2 itself, the radio data communication equipment 10 subsequently informs the WAN radio data communication equipment 6 on the first nautical vessel 2 of the existence of a collision or possible collision of the radio access resources.

Next, at step 42, "Reporting radio access collision information to core network", the WAN radio data communication equipment 6 on the first nautical vessel 2 reports to or informs the terrestrial CN 15 about the radio access resource collision between the nautical vessels 2, 3.

The CN 15 initially allocates respective WAN radio access resources for operation by the WAN radio data communication equipment 6, 7 applied on the nautical vessels 2, 3. After receiving a report of the collision of the radio access resources, the CN 15 may check measurements from Global Positioning System, GPS, on the ships 2, 3 and track position as well as velocity of the ships 2, 3. Based on locations and velocities of the ships 2, 3, as well as the initially allocated radio access resources, the CN 15 may reconfigure the radio access resources for one or both of the WAN radio data communication equipment 6, 7.

As an example, an MIoT cell provided by the first nautical vessel 2 may send a message to the CN 15, informing the CN 15 about collision of radio access resources, i.e. use of the same the RA sequences by the ships 2, 3. The CN 15 may choose to reconfigure the MIoT cell of the faster one of the two ships 2, 3 with a unique and different set of RA sequences for it to provide radio communication service.

If there is no significant difference in speeds of the ships 2, 3, the CN 15 may choose either one of the ships to change its RA sequences. It is also possible that there are not enough radio access resources for each ship to operate unique radio access resources. In this case, the CN 15 will send a dialog to the user of the ships, via Input/Output, I/O, equipment connected to the WAN radio data communication equipment 6, 7, alerting them of high transportation traffic in the current location and of an urgent need for optical observation of the surrounding environment, for example.

At step 43, "Receiving radio resource allocation information from core network", the WAN radio data communication equipment 6 on the first nautical vessel 2 receives radio resource allocation information from the CN 15, via the satellite communication network 20, 21, 22, and the satellite radio data communication equipment 16, with respect to the radio access resources to be used by the WAN radio data communication equipment 6, for resolving the radio access resource collision. The received information may be such that the WAN radio data communication equipment 6 on the first nautical vessel may remain to operate the current radio access resources or has to change to other radio access resources.

Those skilled in the art will appreciate that the radio data communication equipment 11 operating as UE on the second nautical vessel 3 may likewise communicate collision information to the CN 15 and the WAN radio data communication equipment 7 on the second nautical vessel 3 may also receive updated radio access resource information from the CN 15.

As the the WAN radio data communication equipment 6, 7 on the first and second nautical vessels 2, 3 now operate on different radio access resources, at step 44, "Establishing radio data communication link with radio data communication equipment of nautical beacon in operating position", radio communication links 28 or 29 and/or 30 or 31 may be established between the WAN radio data communication equipment 6, 7 and radio data communication equipment 8, 9 on one or more nautical beacons 4, 5 based on the respective WAN radio access resource information, when the radio data communication equipment 8, 9 of the nautical beacons 4, 5 is in an operating position and, of course, in communication neighborhood, i.e. within communication range, of a nautical vessel 2, 3. See FIG. 1. The operating position of the nautical beacons 4, 5 for establishing a radio communication link will be described later, with reference to the operation of the nautical beacons.

A connection, session or attach procedure for establishing a radio communication link 28, 30 between the WAN radio data communication equipment 6 and the radio data communication equipment 8, 9 on the nautical beacons 4, 5 may comprise a challenge response procedure between the RBS 6 and the UE 8, 9 for verifying an IMSI, International Mobile Subscriber Identity, of the connected nautical beacons 4, 5.

The RBS 6 on the nautical vessel 2 may use the verified IMSI of the fixed nautical beacon 4 to retrieve detailed information about a possible danger, warning or other information provided or measured by the nautical beacon 4, by checking the information database 25, via the satellite radio data communication equipment network 16, 20, 21, 22 with the CN 15.

For a mobile nautical beacon 5 with its URI registered in the server 23 of the CN 15, the URI may also be used to search for information or a danger identification corresponding to the URI in the information database 19, when E-RAB is established already.

For a geographically stationary nautical beacon 4 such as a buoy, the MIoT cell provided by the WAN radio data communication equipment 6, 7 on a nautical vessel 2, 3 may perform a short attach via the challenge response with the MI modem applied at the nautical beacon 4, and by ending the procedure by sending an AUTHENTICATION RESPONSE to the MI modem of the nautical beacon 4. There is no need to grant Data over Non-Access Stratum, DoNAS, resources for transmission.

If the nautical vessel 2 is supposed to remain connected with the nautical beacon 4 for updating a geographic position of the nautical beacon 4, or for other purpose, the RBS 6 sends an AUTHENTHICATION RESPONSE and grants DoNAS resources to the radio data communication equipment 8 operating as UE.

With the establishment of the radio communication link(s) 28, 29 and/or 30, 31, the WAN radio data communication equipment 6, 7 may also get the nautical beacons' geographic locations, by operating the WAN radio data communication equipment 6, 7 as an RBS to locate the radio data communication equipment 8, 9 of the nautical beacons 4, 5.

If a nautical vessel 2, 3 is equipped with electronic navigation systems that can show the ship's geographic location and sailing course on a display device, such as a screen (not shown), obtaining the geographic locations of the nautical beacons 4, 5 once is sufficient. The obtained locations of the nautical beacon 4, 5 may remain on the display device of a nautical vessel 2, showing a type and position of a possible danger or warning or other information indicated by each of the nautical beacons 4, 5.

After getting to know the information indicated by a nautical beacon 4, 5, a first nautical vessel 2 may easily pass a warning to one or more further or second nautical vessels 3, by establishing a direct radio data communication link 32 between WAN radio data communication equipment 6 on the first nautical vessel 2 and WAN radio data communication equipment 7 on the at least one further or second nautical vessel 3. See FIG. 1. Depending on the processing capacity of the radio equipment of the nautical vessels 2, 3 in communication with each other, data exchanged between them may include the location, type and other useful information about the danger, warnings or other information indicated by a respective nautical beacon 4, 5 connected to the first nautical vessel 2.

The WAN radio data communication equipment 6 on a nautical vessel 2 may also pass a warning or other information to the radio data communication equipment 9 applied on mobile nautical beacons 5 that it approaches. As mentioned above, the mobile nautical beacons 5 may be installed at a relatively small boat and may have limited radio communication ability, either or both in terms of data transmission capacity and radio transmission power or range.

The WAN radio data communication equipment 6 operating as the RBS may maintain a list of identifications of radio data communication equipment 8, 9 on all connected nautical beacons 4 or 5 for a certain period of time, such as 10-30 minutes, for example. The lists is constantly updated by adding newly connected radio data communication equipment 8, 9, and removing the disconnected one when it is no longer in the service area of the RBS 6, for example for more than 15 minutes after being disconnected.

The WAN radio data communication equipment 6, 7 at the nautical vessels 2, 3 may be arranged to transmit warning information, or other information, received at a distance of several kilometres of a nautical beacon 4, 5, including time of spotting, type and position of each stationary 4 and mobile beacons 5 to all connected mobile nautical beacons 5, such that a mobile beacon 5 becomes aware of the surrounding environment as well.

This information may be transmitted from a nautical vessel 2, 3 to a mobile nautical beacon 5 via a radio data communication link 28 or 29 established between the WAN radio data communication equipment 6 or 7 on a nautical vessel 2 or 3. However, the WAN radio data communication equipment 6, 7 may also establish a direct sidelink between the involved nautical beacons 4, 5 such that information may be exchanged between the nautical beacons 4, 5 without the WAN radio data communication equipment 6 on the first nautical vessel 2 functioning as a relay station, such as illustrated by the double arrow 33 in FIG. 1. UE procedures related to sidelink are, for example, disclosed in 3GPP TS 36.213 V15.5.0 (2019-03).

The above describes a nautical vessel with its WAN radio data communication equipment connected to radio data communication equipment on nautical beacons informing other nautical vessels and mobile nautical beacons of the existence of stationary and/or mobile nautical beacons in the vicinity of a nautical vessel, for example. There is, however, also the possibility that a plurality of nautical vessels are located nearby a mobile nautical beacon. In this case, it is beneficial for each and every nautical vessel to know the presence of the mobile nautical beacon, such that the big or bigger vessels may avoid a small or smaller boat comprising the mobile beacon 5.

Figure 3:
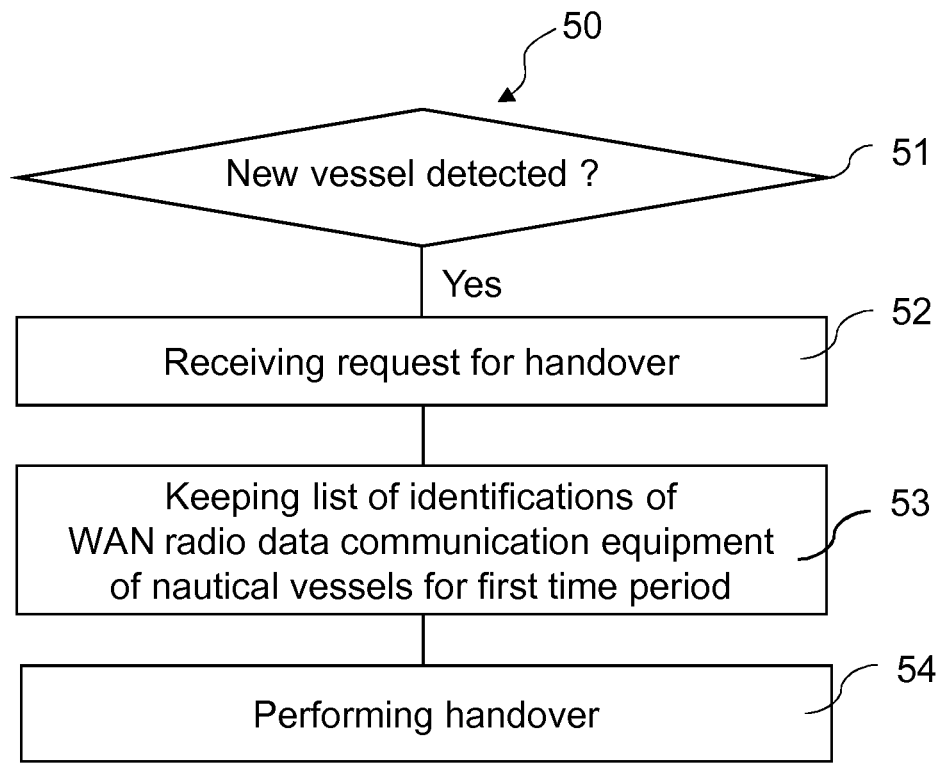
FIG. 3 illustrates, in a flow chart diagram, a handover procedure of a radio communication link to WAN radio data communication equipment applied on an other nautical vessel in accordance with an embodiment of the present disclosure.

FIG. 3 illustrates, in a flow chart type diagram, a handover procedure 50, of a communication link from the WAN radio data communication equipment 6 on the first nautical vessel 2 connected to the mobile nautical beacon 5, to WAN radio data communication equipment 7 on the further nautical vessel 3, for example, in accordance with an embodiment of the present disclosure.

At step 51, "New vessel detected?", when the radio data communication equipment 9 of a mobile nautical beacon 5 receives an indication of available radio access resource information, such as RA sequences, from WAN radio data communication equipment 7 on a further nautical vessel 3, the radio data communication equipment 9 of the mobile nautical beacon 5 determines that a new vessel, i.e. a new RBS, is approaching.

Based on this determination, the radio data communication equipment 9 operating as UE on the mobile nautical beacon transmits a request to the presently connected WAN radio data communication equipment 6 on the first nautical vessel 2, for a handover of the data communication link to the WAN radio data communication equipment 7 applied on the further nautical vessel 3.

As an example, the radio data communication equipment 9 of the mobile nautical beacon 5 may add an identification of the WAN radio data communication equipment 7 of the approaching nautical vessel 3 to a list of connected vessels. The list is maintained by the mobile nautical beacon 5 for the WAN radio data communication equipment of the nautical vessels from which it receives an indication of available radio access resource information. The list is constantly updated by adding identifications of newly detected WAN radio data communication equipment and removing identifications of WAN radio data communication equipment that the mobile nautical beacon 5 is not in its coverage range any longer. Such as illustrated by step 53, "Keeping list of identifications of WAN radio data communication equipment of nautical vessels".

The list may be maintained by the nautical beacon 5 for the WAN radio data communication equipment 6, 7 of the nautical vessels from which the beacon 5 receives RA sequences over a period of time in the past, for example during the previous 15 minutes.

An identification may be removed, after a period of time, for example 1-10 minutes, after the corresponding WAN radio data communication equipment becomes inactive to the radio data communication equipment 9, that is, after the radio data communication equipment 9 no longer receives RA sequences therefrom.

At step 53, "Receiving request for handover", the WAN radio data communication equipment 6 on the first nautical vessel 2 receives, from the radio data communication equipment 9 on the mobile nautical beacon 5, a request for handover of the radio communication link 28 to the newly detected WAN radio data communication equipment 7 on the other nautical vessel 3, that is approaching.

Then, at step 54, "Performing handover", the WAN radio data communication equipment 6 on the first nautical vessel 2 performs handover of the radio communication link 28 to the WAN radio data communication equipment 7 on the other nautical vessel 3.

The handover may be an S1 handover performed by the WAN radio data communication equipment 6 on the first nautical vessel 2, which allows a communication link 29 to be established between the WAN radio data communication equipment 7 on the next ship 3, whose identification is the next on the list maintained by the mobile nautical beacon 5, and the radio data communication equipment 9 on the mobile nautical beacon 5.

When there are more than two ships on the list, the handover is performed in a Round Robin manner towards each ship on the list. Each request for handover may be delayed by a period of time, such as 1-2 seconds, for example.

It will be appreciated that a handover may also be initiated from a mobile nautical beacon 4, for example when an NB-IoT modem 8 applied at a nautical beacon 4 receives RA sequences from the RBS of the second nautical vessel 3. For serving multiple ships with forced reconnection, transmission on occasion may be turned off and may be turned on when the number of ships on the list goes to one, for example.

Figure 4:
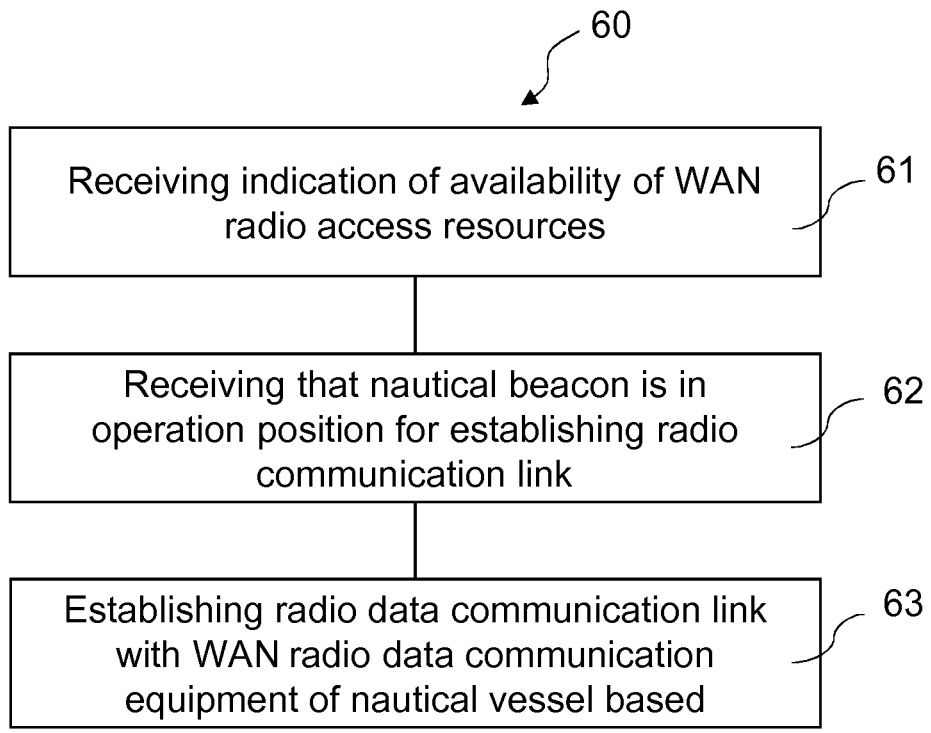
FIG. 4 illustrates, in a flow chart diagram, a method of data exchange by radio data communication equipment applied on a nautical beacon in accordance with an embodiment of the present disclosure.

FIG. 4 illustrates, in a flow chart, a method 60 of data exchange by radio data communication equipment applied on a nautical beacon in accordance with an embodiment of the present disclosure.

In use, radio data communication equipment 8, 9 arranged on nautical beacons 4, 5 are operated in a listening mode, for receiving an indication of availability of WAN radio access resources, such as RA sequences, from WAN radio data communication equipment 6, 7 operating as RBS on the nautical vessels 2, 3.

At step 61, "Receiving indication of availability of WAN radio access resources", when the radio data communication equipment 8, 9 on a nautical beacon 4, 5 receives RA sequences from WAN radio data communication equipment 6, 7 on a nautical vessel 2, 3, these RA sequences are interpreted as the indication of availability of WAN radio access resources provided by the nautical vessel 2, 3.

Following that, at step 62, "Receiving that nautical beacon is in operating position for establishing radio communication link", the radio data communication equipment 8, 9 on the nautical beacon 4, 5 receives, from an operating position detection device applied at the nautical beacon 4, 5, that the nautical beacon 4, 5 is in an operating position for establishing a radio communication link.

In an embodiment, when the radio data communication equipment 8, 9 on the nautical beacon 4, 5 receives RA sequences as an indication of availability of radio resources from the WAN radio data communication equipment 6, 7 on a nautical vessel 2, 3, the operating position detection device of the nautical beacon 4, 5 starts to determine whether the beacon is in an operating position, for example by measuring altitudes of the nautical beacon 4, 5. The altitude measurements are performed periodically, for example once every 0.1 or 0.2 second, during a period of time of, for example, 1-2 minutes.

The operating position detection device may comprise a Global Positioning System, GPS, module or equivalent, built in the nautical beacon 4, 5. Using GPS, the altitudes may be determined from measured geographical positions of a nautical beacon. In an alternative embodiment, when a nautical beacon 4, 5 is equipped with a sonar based operating position detection device, beacon altitudes may be determined from sonar measurements with respect to the sea bottom, for example.

Figure 5:
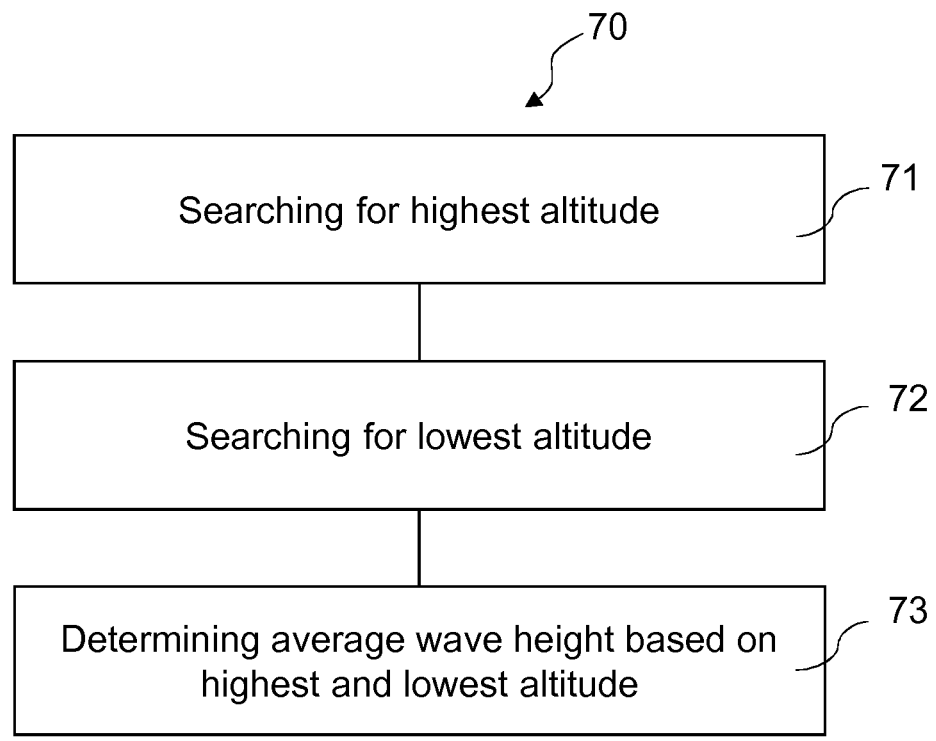
FIG. 5 illustrates a method of calculating average wave height in accordance with an embodiment of the present disclosure.

The determined altitudes are used to calculate a reference altitude, such as an average wave height. FIG. 5 illustrates a method 70 of calculating a reference altitude in accordance with an embodiment of the present disclosure and FIG. 6 schematically illustrates a nautical beacon 4 in rippling water 29.

From a number of measurements, at step 71, "Searching for highest altitude", an altitude H is determined, that is the highest among the measurements performed. Then, at step 72, "Searching for lowest altitude", an altitude L is determined, that is the lowest among the measurements performed. Following this, at step 73, "Determining average wave height based on highest and lowest altitudes", an average wave height or amplitude A is calculated, which is defined as half of the difference between the highest and lowest altitudes $A=(H-L)/2$. The reference altitude R is then calculated by decreasing the maximum altitude H with the average wave height A or by increasing the minimum altitude L by the average wave height A, for example.

In operation, a momentary altitude of the nautical beacon determined by the operating position detection device thereof is compared with the present reference altitude. If the momentary altitude of the nautical beacon exceeds a threshold value T above the reference altitude R, say the present altitude is above the reference altitude R with about 50% or more of the average wave height A, the radio data communication equipment of the nautical beacon is assumed to be in its operating position for establishing a radio data communication link 30 or 31 with the WAN radio data communication equipment 6 of the nautical vessel 2 and/or the WAN radio data communication equipment 7 of the nautical vessel 3, whichever is possible to establish, for transmitting data from the beacon to a nautical vessel, or vice versa.

Figure 6:
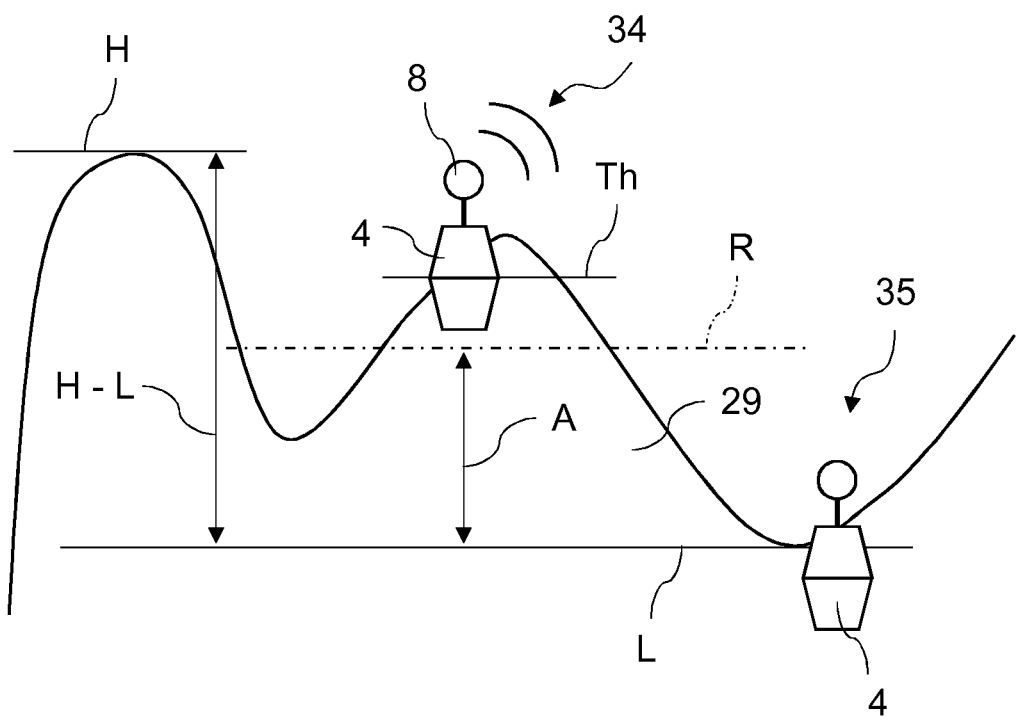
FIG. 6 schematically illustrates a nautical beacon in rippling water.

With the above calculation of the operating position of a nautical beacon based on altitude measurements or position measurements and average wave height, it is established that a nautical beacon only transmits data to a nautical vessel if the beacon, such as a geographic stationary beacon 4, is at or near the top of a wave, as schematically illustrated in FIG. 6. In this figure, reference numeral 34 refers to an operating position wherein the beacon 4 is in a geographical or physical position for transmitting data over a radio link, while reference numeral 35 refers to a non-transmitting beacon 4, i.e. a beacon that is not in an operating position.

It will be appreciated that in the operating position 34 the probability of successfully transmitting data from the beacon 4 to a vessel 2, 3 is higher than in position 35 of the beacon 4. By only transmitting from the beacon 4 in the operating position thereof, scarce transmission energy is only consumed by the radio communication equipment of the beacon 4 when the probability of a successful data exchange is high, and no energy is wasted by transmitting from the beacon in a position that is difficult to obtain a connection with sufficient data transfer quality.

The nautical beacon continues to periodically provide beacon altitudes when indications of radio access resources are received from the WAN radio data communication equipment of a nautical vessel. After stopping receipt of such indications, e.g. RA sequences, the operating position detection device of a nautical beacon may keep measuring for a certain period of time, say 1-15 minutes, and then may stop the determination of altitudes.

Before establishing a connection by the radio data communication equipment of a nautical beacon, it is checked again whether the indication of availability of WAN radio access resources is received within a predetermined period of time, say within less than 10-15 minutes prior to determining that the nautical beacon is in an operating position, such as that the current altitude is at or above the threshold altitude. If the answer is positive, then it is determined that the nautical beacon 4 is in its operating position and that a radio link with the RBS radio data communication equipment of a nautical vessel can be established, i.e. that a nautical vessel is still in a communication range.

It will be appreciated that the altitude measurements and wave height calculations by a nautical beacon may also be used for informing a nautical vessel about a rough water condition, for example.

Figure 7:
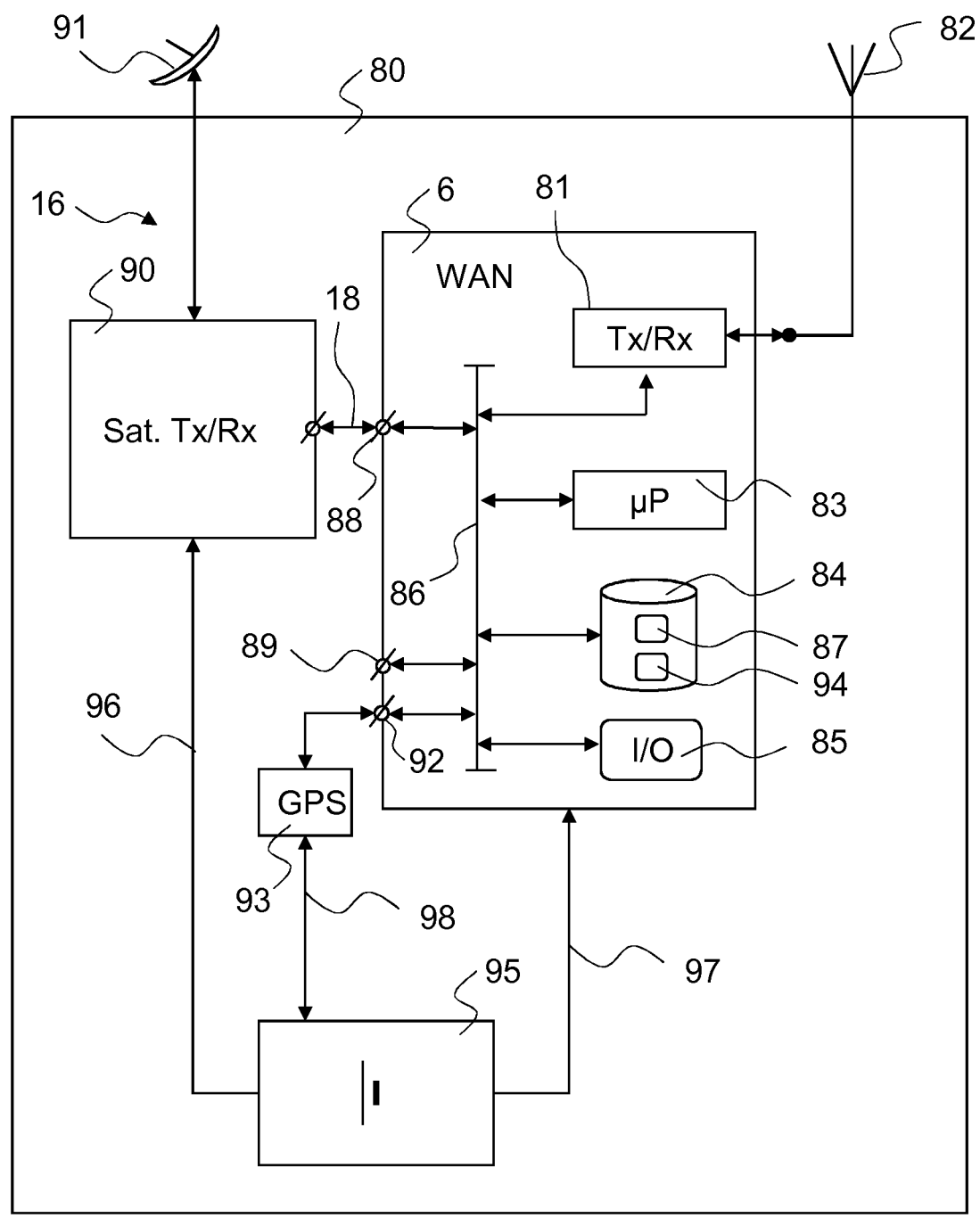
FIG. 7 schematically illustrates nautical vessel Wide Area Network, WAN, radio data communication equipment for operating in accordance with the method of the present disclosure.

FIG. 7 schematically illustrates radio data communication equipment 80 on board of a nautical vessel 2, for example, comprising satellite radio data communication equipment 16 and Wide Area Network, WAN, radio data communication equipment 6, arranged for operating in accordance with the method of the present disclosure.

The nautical vessel WAN radio data communication equipment 6 is arranged to operate as radio base station, RBS, that is to provide radio network access functionality, for radio access to and data exchange with radio data communication equipment operating as a User Equipment, UE, 8, 9 applied on a nautical beacon 4, 5.

The nautical vessel WAN radio data communication equipment 6 operatively connects by a wired or wireless connection 18 to a Satellite Transmitter/Receiver, Sat. Tx/Rx, radio transceiver device 90 of the satellite radio data communication equipment 16. The radio transceiver device 90 operatively connects by a radio satellite antenna 91, an intermediate radio satellite communication network 20 and land based radio satellite data communication equipment 21, to the terrestrial Core data communication Network, CN, 15. Operation of the radio satellite data communication equipment 16 is generally known to the person skilled in the art.

The nautical vessel WAN radio data communication equipment 6, in the embodiment shown, comprises a radio transceiver device, Tx/Rx, 81, connected to a radio antenna, 82, a processor or processing device or devices 83, such as microprocessor, µP, devices, data and computer program memory or storage 84, and data input/output, I/O, devices 85.

The devices 81-85 connect by a central data exchange bus 86, for mutual internal exchange of signalling and content data, and for external data exchange with the satellite radio transceiver 90 and via connection 12 (see FIG. 1) with user equipment, UE, 10 available on the nautical vessel 2, 3, using respective wired or short range wireless operating data interfaces 88 and 89, connected to the data bus 86. It is noted that the UE 10 and the WAN radio data communication equipment 6 may also exchange data via a connection 12 operative via the radio antenna 82 and radio transceiver 81, while the I/O devices 85 may additionally or alternatively connect external from the WAN radio data communication equipment 6.

Optionally, the communication equipment 80 of a nautical vessel 2 may comprise a geographic position detection device 93, operatively connected to the WAN radio data communication equipment 6, via a wired or short range wireless operating data interface 92 and the data bus 86, arranged for position detection measurements for establishing the geographic position of the nautical vessel, such as a Global Positioning System, GPS, for example. For the purpose of the present disclosure, use may also be made from on-board position detection equipment of a nautical vessel.

For completeness sake, the radio satellite transceiver 90, the WAN, radio data communication equipment 6, and the GPS device 93 are electrically powered 96, 97, 98 from an electric power source 95.

The WAN radio data communication equipment 6 is arranged for operating as radio base station, RBS, for providing radio access to radio data communication equipment 8, 9 operating as UE applied on a nautical beacon in accordance with the present disclosure as elucidated above, under control of the processing device or devices 83, and computer program code 87 stored on the computer readable memory or storage 84, for example, when executed by the at least one processing device 83. Reference numeral 94 refers to a list of identifications of radio data communication equipment 8, 9 applied on nautical beacons 4, 5 with which a radio data communication link 30, 31 is established.

In an exemplary embodiment, the WAN radio data communication equipment 6 is arranged to operate a Massive Internet of Things, MIoT, cell.

Figure 8:
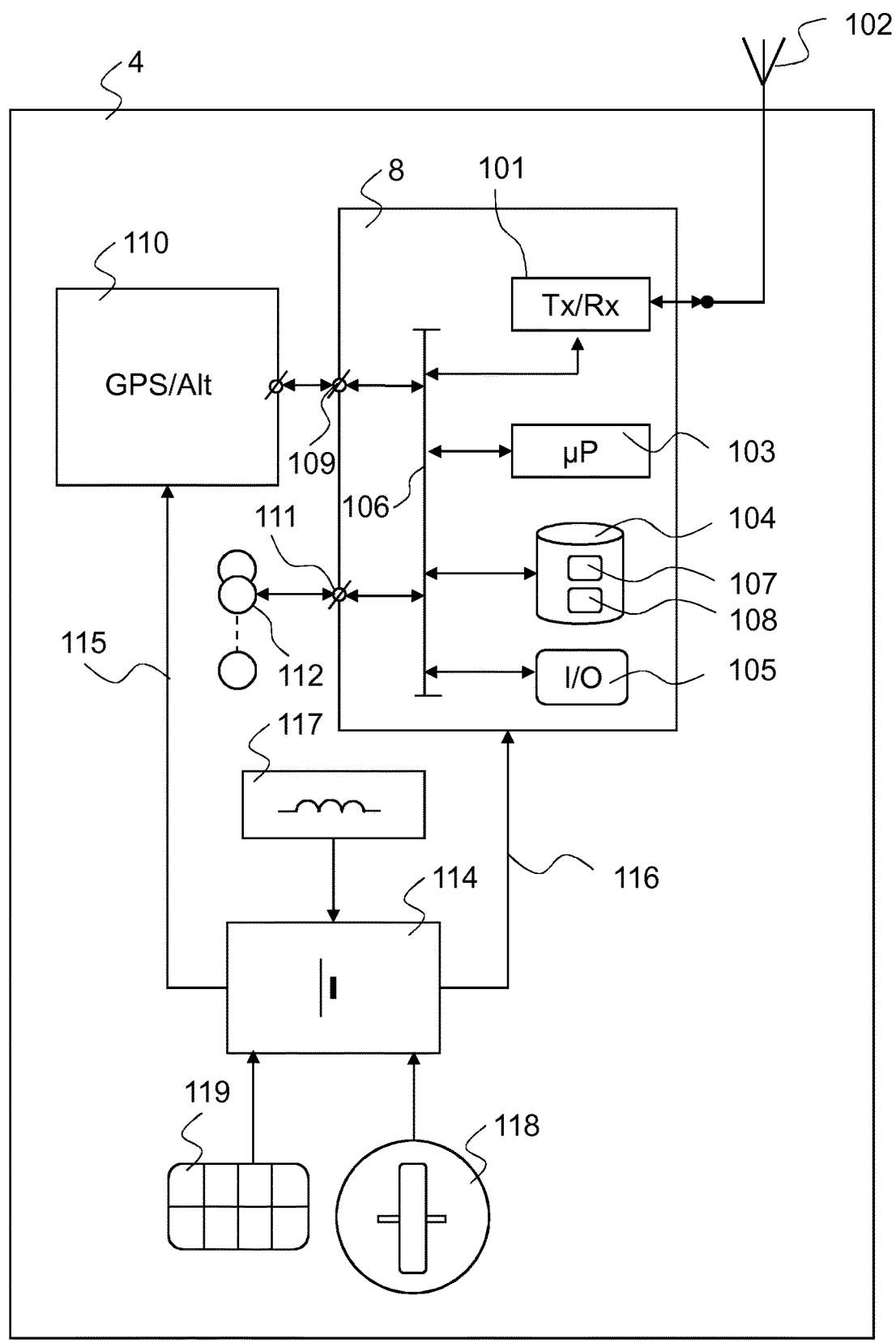
FIG. 8 schematically illustrates nautical beacon radio data communication equipment for operating in accordance with the method of the present disclosure.

FIG. 8 schematically illustrates a nautical beacon 4 comprising radio data communication equipment 8, a beacon operating position detection device 110 and an electric power source 114, arranged for operating in accordance with the method of the present disclosure.

The radio data communication equipment 8 is arranged for operating as User Equipment, UE, for accessing radio access resources provided by WAN radio data communication equipment 6, 7 operating as a radio base station, RBS, applied on a nautical vessel.

The radio data communication equipment 8, in the embodiment shown, comprises a radio transceiver device, Tx/Rx, 101, connected to a radio antenna, 102, a processor or processing device or devices 103, such as microprocessor, µP, devices, data and computer program memory or storage 104, and data input/output, I/O, devices 105.

The devices 101-105 connect by a central data exchange bus 106, for mutual internal exchange of signalling and content data, and for external data exchange with the beacon operating position detection device 110, via a data interface 109, and one or more sensors and/or other measuring devices 112, via a data interface 111. The sensors and/or other measuring devices 112, if available, may be arranged for measuring meteorological parameters such as water and ambient air temperature, hours of sunshine, ambient air pressure, and other parameters relating to water quality, geographic position of the beacon 4, etc. The data interfaces 109 and 111 may be both wired and short range wireless operating interfaces, for example.

The operating position detection device 110 of the nautical beacon 4 is arranged for determining that the beacon is in an operating position for establishing a radio communication link by the radio data communication equipment 8. In the embodiment shown, the operating position detection device 110 comprises a Global Positioning System, GPS, module or equivalent, built in the nautical beacon 4.

Altitudes of the nautical beacon when moving on the sea or water, are calculated from measured geographical positions of a nautical beacon. These calculations may be performed by processing equipment provided by the operating position detection device 110 itself, or by the processor or processing device or devices 103, for example. In an alternative embodiment, the nautical beacon may be equipped with a sonar based operating position detection device for determining beacon altitudes from sonar measurements with respect to the sea bottom, for example.

The radio data communication equipment 8, the beacon operating position detection device 110 and the sensors 112 are electrically powered 115, 116 from an on-board electric power source 114, such as a battery. As mentioned previously, electric energy at nautical devices such as geographically stationary beacons or buoys operative at sea 4 is scarce. Although the present disclosure provides an energy efficient communication operation of a nautical beacon, that may be characterized in a short as 'transmission on occasion', the nautical beacon 4 shown in FIG. 8 is provided with electric energy generating devices 117, 118 and 119 connect to the battery 114, for charging same.

In the embodiment shown, battery power is provided by one or more of an induction power source 117, an inertia based power source 118 and a solar power source 119. Both the induction power source 117 and the inertia based power source 118, for example comprising a flywheel based electric generator, generate electric energy by linear or rotary movements induced by the movement of the nautical beacon 4 when operating in water. In this manner, the nautical beacon is expected to sustain for a long period of time without the need of replacing energy storage devices.

The nautical beacon radio data communication equipment 8 is arranged for operating as UE, for accessing WAN radio data communication equipment 6, 7 operating as RBS applied on a nautical vessel 2, 3 in accordance with the present disclosure, as elucidated above, under control of the processing device or devices 103, and computer program code 107 stored on the computer readable memory or storage 104, for example, when executed by the at least one processing device 103. Reference numeral 108 refers to a list a list of identifications of WAN radio data communication equipment 6, 7 applied on nautical vessels 2, 3 available for radio data communication.

It will be appreciated that the communication equipment of a mobile beacon 5, such as a small boat or the like, may have an identical construction as illustrated above with respect to a mobile nautical beacon 4, however the electric powering may be provided by an on-board electric power source of the beacon itself, for example.

The nautical beacon radio data communication equipment may be a arranged, in an exemplary embodiment of a geographically stationary nautical beacon, for operating a Narrowband IoT, NB-IoT, UE device, or in case of a geographically non-stationary nautical beacon for operating a Long Term Evolution, LTE, Category M1 UE device, for example.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of data exchange by Wide Area Network, WAN, radio data communication equipment operating as a radio base station, RBS, applied on a plurality of nautical vessels, for providing radio access to radio data communication equipment operating as a User Equipment, UE, applied on at least one nautical beacon, the WAN radio data communication equipment arranged for data exchange with radio data communication equipment operating as a UE applied on a same nautical vessel, and for data exchange with a terrestrial core data communication network, the method comprising:
   receiving, by the WAN radio data communication equipment applied on a first nautical vessel, from the radio data communication equipment operating as a UE applied on the first nautical vessel, radio access collision information relating to WAN radio communication equipment applied on a second nautical vessel operating WAN radio access resources colliding with WAN radio access resources operated by the WAN radio communication equipment applied on the first nautical vessel;
   reporting, by the WAN radio data communication equipment applied on the first nautical vessel, the radio access resource collision information to the terrestrial core data communication network;
   receiving, by the WAN radio data communication equipment applied on the first nautical vessel, from the terrestrial core data communication network, radio resource allocation information for operating WAN radio access resources by the WAN radio data communication equipment applied on the first nautical vessel; and
   establishing, by the WAN radio data communication equipment applied on the first nautical vessel, a radio data communication link with radio data communication equipment applied on at least one nautical beacon in an operating position thereof, based on the information for operating WAN radio access resources.

2. The method according to claim 1, further comprising establishing, by the WAN radio data communication equipment applied on the first nautical vessel, a radio data communication link with WAN radio data communication equipment applied on at least one further nautical vessel, for exchanging data between the WAN radio data communication equipment applied on the first and the at least one further nautical vessels.

3. The method according to claim 2, further comprising keeping, for a predetermined period of time, by the WAN radio data communication equipment applied on the first nautical vessel, a list of identifications of radio data communication equipment applied on nautical beacons with which a radio data communication link is established.

4. The method according to claim 2, further comprising establishing, by the WAN radio data communication equipment applied on the first nautical vessel, at least one further radio data communication link for exchanging data between radio data communication equipment applied on the at least one nautical beacon and radio data communication equipment applied on at least one geographically non-stationary further nautical beacon, in particular, wherein the at least one further radio data communication link is a sidelink.

5. The method according to claim 2, further comprising:
receiving, by the WAN radio data communication equipment applied on the first nautical vessel, from the radio data communication equipment applied on the at least one nautical beacon, a request for handover of the radio communication link to WAN radio data communication equipment applied on another nautical vessel; and
performing, by the WAN radio data communication equipment applied on the first nautical vessel, handover of the radio communication link to WAN radio data communication equipment applied on the other nautical vessel.

6. The method according to claim 2, wherein the WAN radio data communication equipment applied on the plurality of nautical vessels receives, from the terrestrial core data communication network, respective initial WAN radio resource allocation information for operating WAN radio access resources by the WAN radio data communication equipment applied on the plurality of vessels, wherein the radio resource allocation information for operating WAN radio access resources by the WAN radio data communication equipment applied on the first nautical vessel in case of radio access resource collision is determined based on the respective initial WAN radio access resources and actual status information of the first and second nautical vessels.

7. The method according to claim 2, wherein the terrestrial core data communication network comprises a data storage device, accessible by the WAN radio data communication equipment applied on a nautical vessel, the data storage device storing data relating to nautical beacon, the method further comprising accessing the data storage device, by the WAN radio data communication equipment applied on the first nautical vessel, for exchanging data relating to the at least one nautical beacon.

8. The method according to claim 1, further comprising keeping, for a predetermined period of time, by the WAN radio data communication equipment applied on the first nautical vessel, a list of identifications of radio data communication equipment applied on nautical beacons with which a radio data communication link is established.

9. The method according to claim 1, further comprising establishing, by the WAN radio data communication equipment applied on the first nautical vessel, at least one further radio data communication link for exchanging data between radio data communication equipment applied on the at least one nautical beacon and radio data communication equipment applied applied on at least one geographically non-stationary further nautical beacon, in particular, wherein the at least one further radio data communication link is a sidelink.

10. The method according to claim 1, further comprising:
receiving, by aid the WAN radio data communication equipment applied on the first nautical vessel, from the radio data communication equipment applied on the at least one nautical beacon, a request for handover of the radio communication link to WAN radio data communication equipment applied on an other nautical vessel; and
performing, by the WAN radio data communication equipment applied on the first nautical vessel, handover of the radio communication link to WAN radio data communication equipment applied on the other nautical vessel.

11. The method according to claim 1, wherein the WAN radio data communication equipment applied on the plurality of nautical vessels receives, from the terrestrial core data communication network, respective initial WAN radio resource allocation information for operating WAN radio access resources by the WAN radio data communication equipment applied on the plurality of vessels, wherein the radio resource allocation information for operating WAN radio access resources by the WAN radio data communication equipment applied on the first nautical vessel in case of radio access resource collision is determined based on the respective initial WAN radio access resources and actual status information of the first and second nautical vessels.

12. The method according to claim 1, wherein the terrestrial core data communication network comprises a data storage device, accessible by the WAN radio data communication equipment applied on a nautical vessel, the data storage device storing data relating to nautical beacons, the method further comprising accessing the data storage device, by the WAN radio data communication equipment applied on the first nautical vessel, for exchanging data relating to the at least one nautical beacon.

13. The method according to claim 1, further comprising, updating, by the WAN radio data communication equipment applied on the first nautical vessel, through radio data communication equipment of the at least one nautical beacon, data relating to the at least one nautical beacon.

14. A method of data exchange, by radio data communication equipment operating as a User Equipment, UE, applied on a nautical beacon, for accessing Wide Area Network, WAN, radio access resources provided by WAN radio data communication equipment operating as a radio base station, RBS, applied on a nautical vessel, the method comprising:
receiving, by the radio data communication equipment applied on the nautical beacon, from WAN radio data communication equipment applied on a nautical vessel, an indication of availability of WAN radio access resources;
receiving, by the radio data communication equipment applied on the nautical beacon, from an operating position detection device of the nautical beacon, an indication that the nautical beacon is in an operating position for establishing a radio communication link, and;
establishing, by the radio data communication equipment applied on the nautical beacon, a radio data communication link with the WAN radio data communication equipment of the nautical vessel based on the WAN radio access resources;
keeping, for a predetermined first period of time, by the radio data communication equipment applied on the nautical beacon, a list of identifications of WAN radio data communication equipment applied on nautical vessels available for radio data communication;
disconnecting, by the radio data communication equipment applied on the nautical beacon, a radio data communication link with the WAN radio data communication equipment applied on the nautical vessel, after a predetermined second period of time; and
establishing, by the radio data communication equipment applied on the nautical beacon, on a Round Robin basis according to the list of identifications, a respective radio data communication link with the WAN radio data communication equipment applied on at least one further nautical vessel.

15. The method according to claim 14, wherein the operating position of the nautical beacon for establishing a radio communication link by the radio data communication equipment thereof is determined by:
periodically determining, by the operating position detection device of the nautical beacon, of altitudes of the nautical beacon;
calculating, by the operating position detection device of the nautical beacon, a reference altitude based on the periodically determined altitudes of the nautical beacon; and
determining, by the operating position detection device of the nautical beacon, that the radio data communication equipment of the nautical beacon is in an operating position when a present altitude of the nautical beacon exceeds a threshold value above the reference altitude.

16. The method according to claim 14, further comprising at least one of establishing the radio data communication link when the indication of availability of WAN radio access resources is received within a predetermined third period of time prior to receiving the indication that the nautical beacon is in an operating position for establishing a radio communication link, and stopping the periodically determining of altitudes of the nautical beacon by the operating position detection device after stopping receiving the indication of availability of WAN radio access resources by the radio data communication equipment applied on the nautical beacon.

17. A nautical vessel Wide Area Network, WAN, radio data communication equipment arranged for operating as radio base station, RBS, for providing radio access to radio data communication equipment operating as a User Equipment, UE, applied on at least one nautical beacon, the WAN radio data communication equipment arranged for data exchange with radio data communication equipment operating as a UE applied on a same nautical vessel, and for data exchange with a terrestrial core data communication network, the nautical vessel WAN radio data communication equipment comprising a transceiver device and a processing device configured for:
receiving, by the transceiver device, from the radio data communication equipment operating as UE on the first nautical vessel, radio access collision information relating to WAN radio communication equipment of a second nautical vessel operating WAN radio access resources colliding with WAN radio access resources operated by the WAN radio communication equipment of the first nautical vessel;
reporting, by the transceiver device, the radio access collision information to the terrestrial core data communication network;
receiving, by the transceiver device, from the terrestrial core data communication network, information for operating WAN radio resource allocation resources by the WAN radio data communication equipment of the first nautical vessel; and
establishing, by the processing device, a radio data communication link with radio data communication equipment of at least one nautical beacon in an operating position thereof, based on the information for operating WAN radio access resources.

18. The nautical vessel WAN radio data communication equipment of claim 17, wherein the nautical vessel WAN radio data communication equipment is arranged to operate a Massive Internet of Things, MIoT, cell.

19. A nautical beacon radio data communication equipment arranged for operating as a User Equipment, UE, for accessing Wide Area Network, WAN, radio access resources provided by WAN radio data communication equipment operating as a radio base station, RBS, applied on a nautical vessel, the nautical beacon radio data communication equipment comprising a transceiver device, a processing device, and an interface for communicating with an operating position detection device, the nautical beacon radio data communication equipment configured for:
receiving, by the transceiver device, from WAN radio data communication equipment applied on a nautical vessel, an indication of availability of WAN radio access resources;
receiving, by the processing device, from the operating position detection device, that the transceiver device is in an operating position for establishing a radio communication link;
establishing, by the transceiver device, a radio data communication link with the WAN radio data communication equipment applied on the nautical vessel based on the WAN radio access resources;
keeping, for a predetermined first period of time, by the radio data communication equipment applied on the nautical beacon, a list of identifications of WAN radio data communication equipment applied on nautical vessels available for radio data communication;
disconnecting, by the radio data communication equipment applied on the nautical beacon, a radio data communication link with the WAN radio data communication equipment applied on the nautical vessel, after a predetermined second period of time; and
establishing, by the radio data communication equipment applied on the nautical beacon, on a Round Robin basis according to the list of identifications, a respective radio data communication link with the WAN radio data communication equipment applied on at least one further nautical vessel.

20. The nautical beacon radio data communication equipment of claim 19, wherein the nautical beacon radio data communication equipment is at least one of a geographically stationary nautical beacon operating a Narrowband IoT, NB-IoT, UE device and a geographically non-stationary nautical beacon operating a Long Term Evolution, LTE, Category M1 UE device.

* * * * *